US012230773B2

United States Patent
Lee et al.

(10) Patent No.: US 12,230,773 B2
(45) Date of Patent: Feb. 18, 2025

(54) BATTERY PACK

(71) Applicant: SAMSUNG SDI CO., LTD., Yongin-si (KR)

(72) Inventors: Sangjoo Lee, Yongin-si (KR); Hanjun Wang, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 346 days.

(21) Appl. No.: 17/197,408

(22) Filed: Mar. 10, 2021

(65) Prior Publication Data

US 2021/0320340 A1   Oct. 14, 2021

(30) Foreign Application Priority Data

Apr. 14, 2020 (KR) .................... 10-2020-0045235

(51) Int. Cl.
*H01M 10/00* (2006.01)
*G01K 7/22* (2006.01)
*H01M 10/42* (2006.01)
*H01M 10/48* (2006.01)
*H01M 50/204* (2021.01)
*H01M 50/531* (2021.01)
*H01M 50/569* (2021.01)

(52) U.S. Cl.
CPC ............ *H01M 10/486* (2013.01); *G01K 7/22* (2013.01); *H01M 10/425* (2013.01); *H01M 10/482* (2013.01); *H01M 50/204* (2021.01); *H01M 50/531* (2021.01); *H01M 50/569* (2021.01); *H01M 2010/4271* (2013.01)

(58) Field of Classification Search
CPC ............. H01M 10/486; H01M 10/425; H01M 10/482; H01M 50/204; H01M 50/531; H01M 50/569; H01M 2010/4271; H01M 2200/00; H01M 50/211; H01M 50/284; H01M 50/289; H01M 2220/20; H01M 50/209; H01M 50/572; G01K 7/22; G01K 1/14; Y02E 60/10; H01C 7/008
See application file for complete search history.

(56) References Cited

U.S. PATENT DOCUMENTS

| 9,190,643 B2 | 11/2015 | Lee |
| 9,537,181 B2 | 1/2017 | Ahn et al. |
| 9,786,962 B2 | 10/2017 | Ahn et al. |
| 2004/0137314 A1* | 7/2004 | Fukui .............. H01M 50/581 |
| | | 429/7 |

(Continued)

FOREIGN PATENT DOCUMENTS

| CN | 102655246 A | 9/2012 |
| CN | 103682503 A | 3/2014 |

(Continued)

OTHER PUBLICATIONS

Chinese Office Action dated Jan. 29, 2024, of the corresponding CN Patent Application No. 202110367092.7.

*Primary Examiner* — Nicholas P D'Aniello
(74) *Attorney, Agent, or Firm* — Lee IP Law, P.C.

(57) ABSTRACT

A battery pack including a frame including a thermistor seat and a thermistor accommodated in the thermistor seat; at least one battery cell on the frame and connected to the thermistor; and a protective circuit module, the protection circuit module including a projection between a portion of the thermistor and the at least one battery cell.

19 Claims, 7 Drawing Sheets

(56) References Cited

U.S. PATENT DOCUMENTS

| | | | |
|---|---|---|---|
| 2012/0225334 A1* | 9/2012 | Lee | H01M 10/486 |
| | | | 429/62 |
| 2013/0122329 A1* | 5/2013 | Park | H01M 50/502 |
| | | | 429/7 |
| 2014/0065448 A1* | 3/2014 | Ahn | H01M 50/105 |
| | | | 429/7 |
| 2014/0147705 A1* | 5/2014 | Wang | H01M 50/507 |
| | | | 429/7 |
| 2014/0220387 A1 | 8/2014 | Lee | |
| 2014/0287276 A1 | 9/2014 | Yoo | |
| 2014/0342191 A1 | 11/2014 | Shin et al. | |
| 2014/0356672 A1* | 12/2014 | Lee | H01M 10/425 |
| | | | 429/186 |
| 2015/0044511 A1 | 2/2015 | Kim et al. | |

FOREIGN PATENT DOCUMENTS

| | | |
|---|---|---|
| CN | 103972600 A | 8/2014 |
| CN | 104078641 A | 10/2014 |
| CN | 104167572 A | 11/2014 |
| CN | 104218198 A | 12/2014 |
| KR | 10-2014-0032596 A | 3/2014 |
| KR | 10-2014-0100108 A | 8/2014 |
| KR | 10-2015-0065280 A | 6/2015 |

* cited by examiner

BATTERY PACK

CROSS-REFERENCE TO RELATED APPLICATION

Korean Patent Application No. 10-2020-0045235, filed on Apr. 14, 2020, in the Korean Intellectual Property Office, and entitled: "Battery Pack," is incorporated by reference herein in its entirety.

BACKGROUND

1. Field

Embodiments relate to a battery pack.

2. Description of Related Art

Secondary batteries refer to batteries that can be repeatedly charged and recharged, unlike non-rechargeable primary batteries. Secondary batteries may be used as energy sources of devices such as mobile devices, electric vehicles, hybrid electric vehicles, electric bicycles, and uninterruptible power supplies. Single-cell secondary batteries or multicell secondary batteries (e.g., battery packs) each including a plurality of cells connected to each other as a unit may be used according to the types of devices that employ secondary batteries.

SUMMARY

The embodiments may be realized by providing a battery pack including a frame including a thermistor seat and a thermistor accommodated in the thermistor seat; at least one battery cell on the frame and connected to the thermistor; and a protective circuit module, the protection circuit module including a projection between a portion of the thermistor and the at least one battery cell.

The projection may protrude from a main body of the protective circuit module above a portion of the thermistor seat and covers the portion of the thermistor in the thermistor seat.

The thermistor may include a thermistor wiring, and the projection may cover one end of the thermistor wiring of the thermistor.

The projection may protrude from the main body of the protective circuit module to cover the portion of the thermistor seat, and the one end of the thermistor wiring may be fixed to the projection.

The one end of the thermistor wiring may be soldered to the projection.

The thermistor may further include a thermistor chip connected to the thermistor wiring, and the thermistor chip may not be covered by the projection.

The one end of the thermistor wiring may be covered by the projection, and another end of the thermistor wiring may be connected to the thermistor chip.

The at least one battery cell directly may face the thermistor chip that is not covered by the projection of the protective circuit module.

The at least one battery cell may include an electrode assembly, a casing surrounding the electrode assembly, and an electrode tab connected to the electrode assembly and extending outwardly through a terrace of the casing; the terrace of the at least one battery cell may be above the thermistor seat; and the electrode tab may extend outwardly from the terrace over the thermistor seat and is connected to the protective circuit module.

The frame may include a cell region having a rim shape surrounding an opening in which at least a portion of the at least one battery cell is accommodated; and a circuit region between adjacent cell regions and in which the protective circuit module is accommodated.

A portion of the at least one battery cell that corresponds to an electrode assembly of the at least one battery cell may be accommodated in the opening of the cell region.

The thermistor seat may be in the circuit region adjacent to the cell region.

The thermistor seat may include a pair of first partition walls extending parallel to each other and surrounding the thermistor; and a second partition wall extending between the pair of first partition walls and connecting end portions of the pair of first partition walls to each other, and the thermistor may be accommodated in a space between the pair of first partition walls and the second partition wall.

The thermistor may include a thermistor wiring and a thermistor chip, and the pair of first partition walls may include thin portions between which the thermistor wiring having a relatively small thickness is arranged, the thin portions having a first height and extending parallel to each other; and thick portions between which the thermistor chip is arranged, the thick portions having a second height that is greater than the first height and extending parallel to each other.

The at least one battery cell may include a first battery cell, a second battery cell, and a third battery cell, which are arranged in a row with the first battery cell between the second battery cell and the third battery cell, the protective circuit module may be between the first battery cell and the second battery cell, the battery pack may further include a flexible circuit board between the first battery cell and the third battery cell.

The frame may include a first cell region, a second cell region, and a third cell region each having a rim shape surrounding openings in which at least portions of the first battery cell, the second battery cell, and the third battery cell are respectively accommodated; a first circuit region between the first cell region and the second cell region and in which the protective circuit module is accommodated; and a second circuit region between the first cell region and the third cell regions and in which the flexible circuit board is accommodated.

The first battery cell and the second battery cell may be electrically connected to the protective circuit module through electrode tabs facing each other and extending toward the protective circuit module.

The third battery cell may be connected to the flexible circuit board through an electrode tab extending toward the flexible circuit board and is electrically connected to the protective circuit module through the flexible circuit board.

The first battery cell and the third battery cell respectively may include electrode tabs oriented in an identical direction, the electrode tab of the first battery cell may be directly connected to the protective circuit module, and the electrode tab of the third battery cell may be connected to the protective circuit module through the flexible circuit between the first battery cell and the third battery cell.

The flexible circuit board may include a main body connected to the electrode tab of the third battery cell; and an extension that extends from the main body along a side surface of the first battery cell around the first battery cell and is connected to the protective circuit module.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
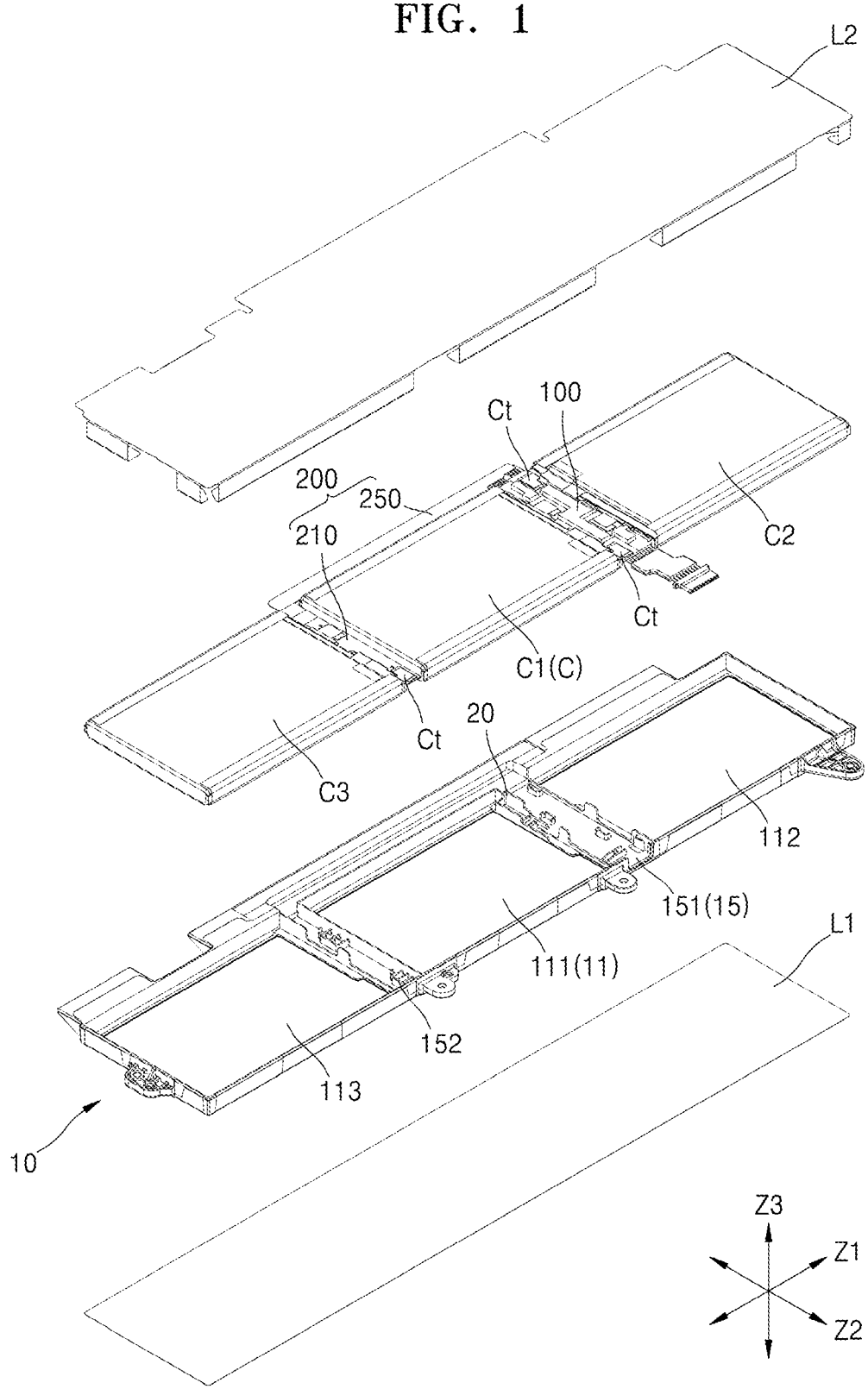
FIG. 1 is an exploded perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" include any and all combinations of one or more of the associated listed items. Expressions such as "at least one of," when preceding a list of elements, modify the entire list of elements and do not modify the individual elements of the list.

Hereinafter, a battery pack will be described according to embodiments with reference to the accompanying drawings.

Figure 2:
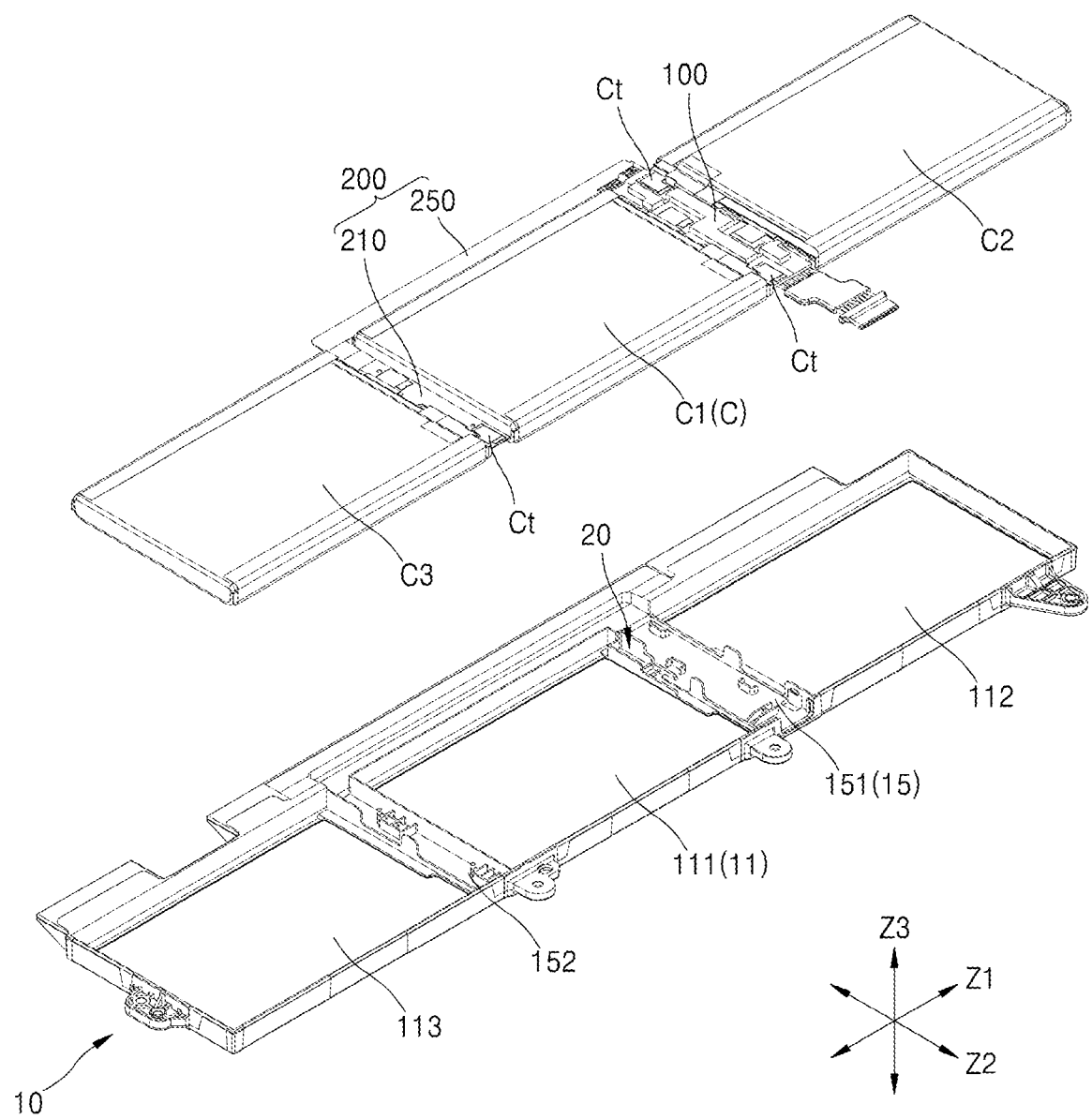
FIG. 2 is an exploded perspective view of a portion of the battery pack shown in FIG. 1.
Figure 3:
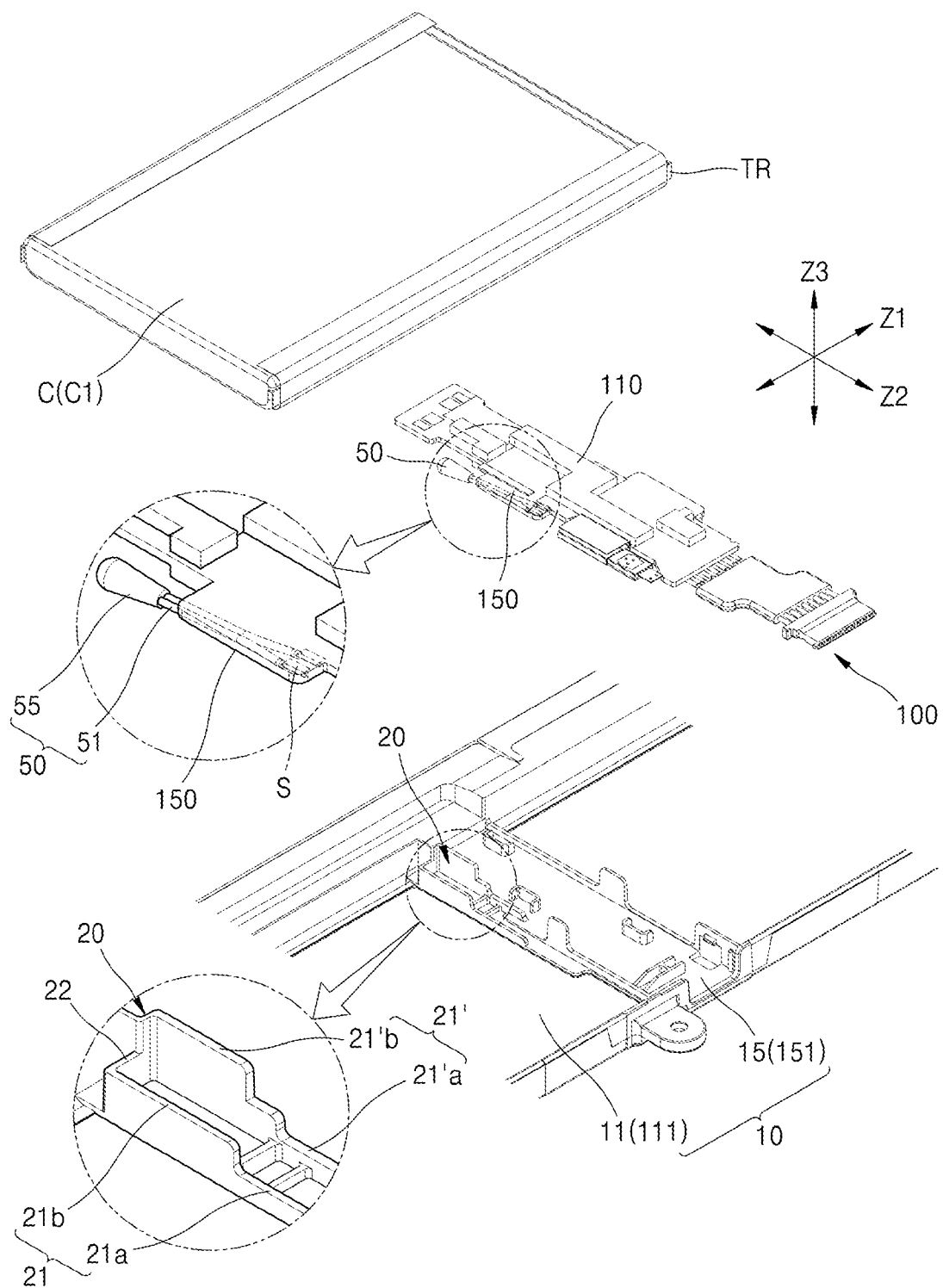
FIG. 3 is an exploded perspective view of a portion of the battery pack shown in FIG. 2.
Figure 4:
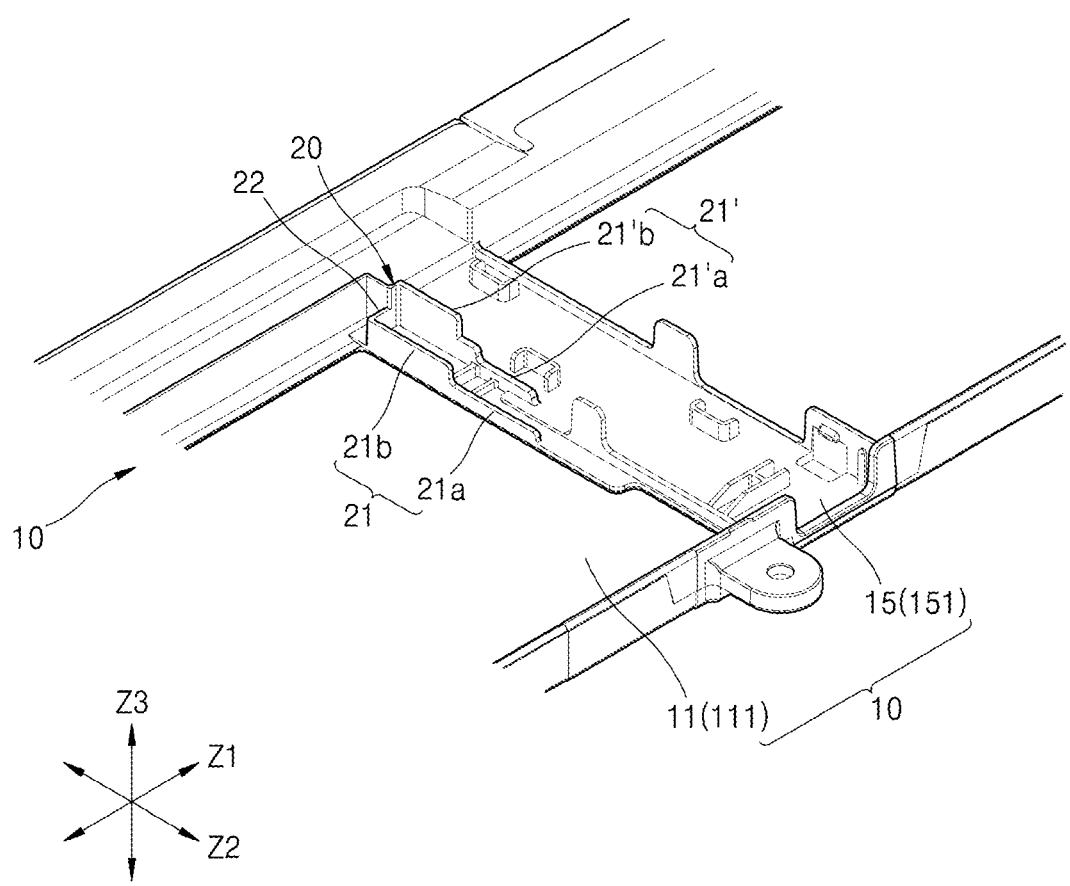
FIGS. 4 to 6 are perspective views of stages in an assembly process of the portion of the battery pack shown in FIG. 3.
Figure 5A:
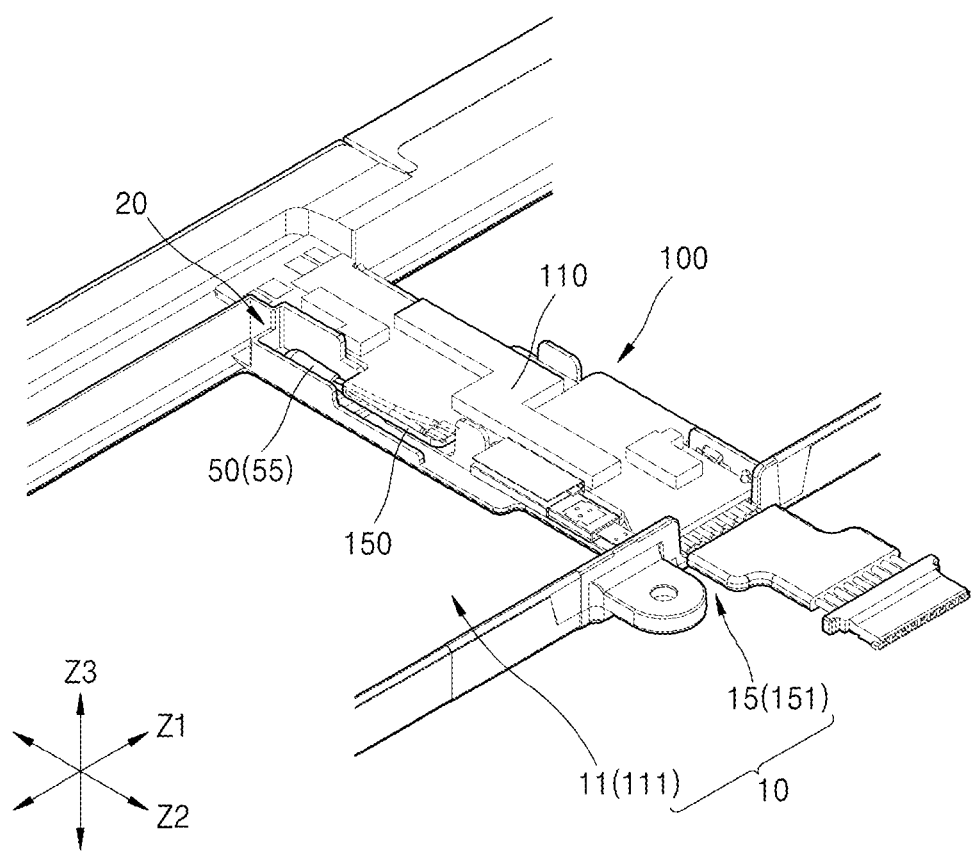
Figure 5B:
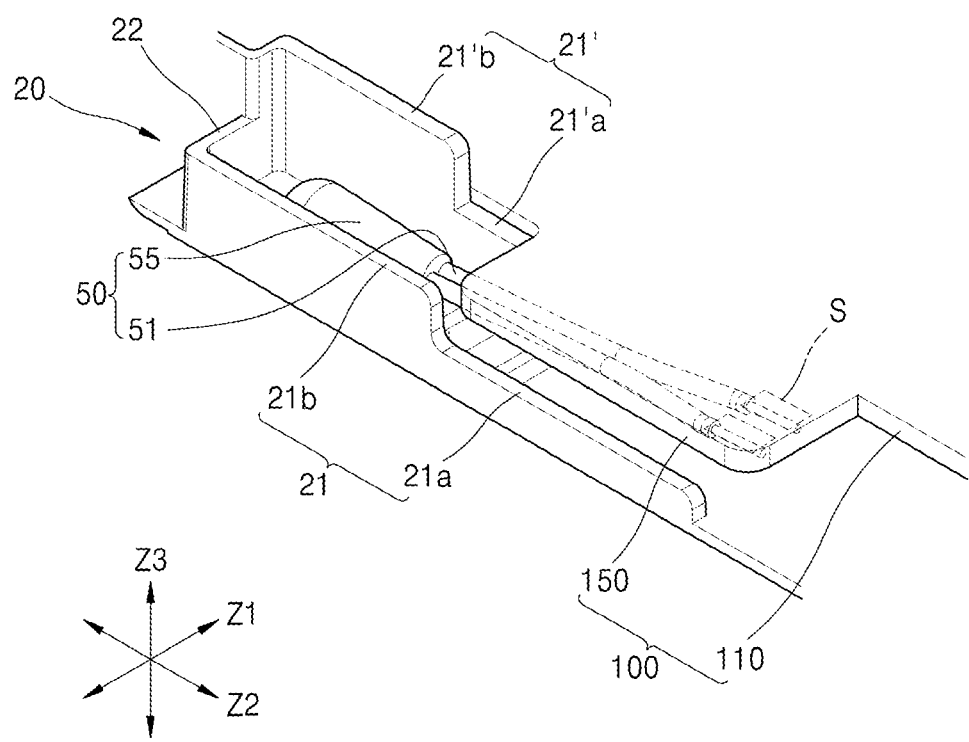
Figure 6:
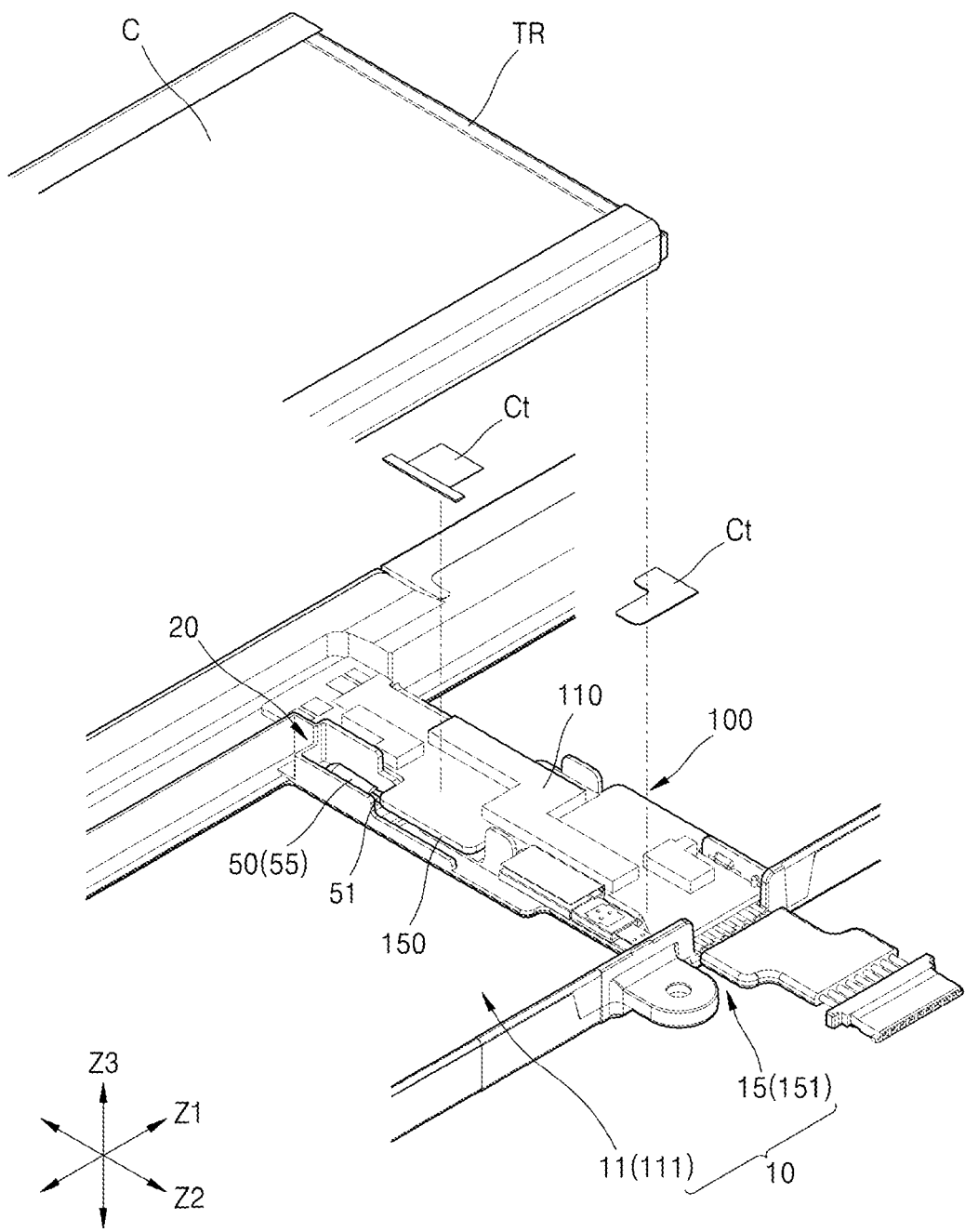

FIG. 1 is an exploded perspective view of a battery pack according to an embodiment. FIG. 2 is an exploded perspective view of a portion of the battery pack shown in FIG. 1. FIG. 3 is an exploded perspective view of a portion of the battery pack shown FIG. 2. FIGS. 4 to 6 are perspective views of stages in an assembly process of the portion of the battery pack shown in FIG. 3. For reference, FIG. 5B is an enlarged perspective view of a portion of FIG. 5A.

Referring to FIG. 3, according to an embodiment, the battery pack may include: a frame 10 on which a thermistor seat 20 may be provided (e.g., to place or accommodate a thermistor 50 therein); a battery cell C on the frame 10 and thermally connected to (e.g., in thermal communication with) the thermistor 50; and a protective circuit module 100 (including a projection 150 between the thermistor 50 and the battery cell C).

Referring to FIG. 1, the battery pack may include, e.g., two or more battery cells C; the protective circuit module 100 and a flexible circuit board 200 electrically connected to the battery cells C; the frame 10 (including cell regions 11 in which the battery cells C are arranged and circuit regions 15 in which the protective circuit module 100 and the flexible circuit board 200 are arranged); and first and second label sheets L1 and L2 which face each other in a state in which the battery cells C, the protective circuit module 100, and the flexible circuit board 200 (which are coupled to the frame 10) are between the first and second label sheets L1 and L2.

Referring to FIG. 2, a number of battery cells C may be two or more. In an implementation, the battery cells C may include a first battery cell C1, a second battery cell C2, and a third battery cell C3, which may be arranged or aligned in a row in a first direction Z1. In an implementation, the first and second battery cells C1 and C2 may face each other with the protective circuit module 100 therebetween, and the third battery cell C3 may be connected to the protective circuit module 100 via the flexible circuit board 200 between the third battery cell C3 and the first battery cell C1. Throughout the present specification, the description of the first and second battery cells C1 and C2 facing each other in the first direction Z1 with the protective circuit module 100 therebetween, may mean that electrode tabs Ct of the first and second battery cells C1 and C2 face the protective circuit module 100, and may also mean that the first and second battery cells C1 and C2 are electrically connected to the protective circuit module 100 through the electrode tabs Ct facing the protective circuit module 100. In an implementation, the first and second battery cells C1 and C2 may be directly connected to the protective circuit module 100, and the third battery cell C3 may be connected to the protective circuit module 100 through the flexible circuit board 200 between the third battery cell C3 and the first battery cell C1. In an implementation, the first and second battery cells C1 and C2 may be connected, through the electrode tabs Ct facing each other in directions parallel to the first direction Z1, to the protective circuit module 100 which is between the first and second battery cells C1 and C2. In an implementation, the first and third battery cells C1 and C3 may be connected to the protective circuit module 100 through electrode tabs Ct of the first and third battery cells C1 and C3 which may be oriented in the same direction (e.g., in the first direction Z1) in such a manner that the first battery cell C1 may be directly connected to the protective circuit module 100, and the third battery cell C3 may be connected to the protective circuit module 100 through the flexible circuit board 200 between the third battery cell C3 and the first battery cell C1.

The flexible circuit board 200 may connect the third battery cell C3 to the protective circuit module 100. In an implementation, the flexible circuit board 200 may include: a main body 210 (connected to the electrode tabs Ct of the third battery cell C3) and an extension 250 (extending from the main body 210 along a side surface of the first battery cell C1 in the first direction Z1 to bypass, e.g., go around, the first battery cell C1 and then be connected to the protective circuit module 100). Throughout the present specification, the description of the flexible circuit board 200 being between the first and third battery cells C1 and C3 may mean that the main body 210 of the flexible circuit board 200 is between the first and third battery cells C1 and C3.

The flexible circuit board 200 may be a flexible film, and the protective circuit module 100 may be a rigid circuit board. In an implementation, the first to third battery cells C1, C2, C3 arranged in a row in the first direction Z1 may be connected to the protective circuit module 100 between the first and second battery cells C1 and C2 in such a manner that the first and second battery cells C1 and C2 are directly connected to the protective circuit module 100, and the third battery cell C3 is connected to the protective circuit module 100 through the flexible circuit board 200.

The frame 10 may include, e.g., the cell regions 11 (in which the battery cells C are arranged or accommodated) and the circuit regions 15 (in which the protective circuit module 100 and the flexible circuit board 200 are arranged or accommodated). In an implementation, the frame 10 may include, e.g., first to third cell regions 111, 112 and 113 in which the first to third battery cells C1, C2, and C3 are respectively accommodated; and first and second circuit regions 151 and 152 respectively between the first to third cell regions 111, 112 and 113 adjacent to each other and in which the protective circuit module 100 and the flexible circuit board 200 are respectively accommodated. In an implementation, the first to third cell regions 111, 112 and 113 and the first and second circuit regions 151 and 152 may be arranged or aligned in the first direction Z1 (e.g., in a lengthwise direction of the frame 10).

The cell regions 11 may be formed in or have a rim shape surrounding openings in which portions of the battery cells C may be respectively accommodated. In an implementation, each of the battery cells C may include an electrode assembly and a pouch-type casing surrounding the electrode assembly, and portions of the battery cells C that correspond to the electrode assemblies may be respectively accommodated in the openings of the cell regions 11.

Referring to FIGS. 2 and 3 together, the thermistor 50 (for measuring the temperature of the battery cells C) may be mounted in at least one of the first and second circuit regions 151 and 152. In an implementation, the thermistor seat 20 may be in the first circuit region 151 in which the protective circuit module 100 is arranged, and the thermistor 50 (which may be thermally connected to the first battery cell C1) may be accommodated in the thermistor seat 20. Throughout the present specification, the description of the thermistor 50 being thermally connected to a battery cell C may mean that the thermistor 50 is arranged at a position adjacent to the battery cell C to measure the temperature of the battery cell C. In an implementation, the thermistor 50 may be in direct contact with a battery cell C or may be in contact with a battery cell C through a heat transfer medium. In an implementation, the thermistor 50 may be at a position adjacent to a battery cell C even though the thermistor 50 is not in contact (e.g., direct contact) with the battery cell C.

The thermistor 50 and a battery cell C may be arranged adjacent to each other to be thermally connected to each other. In an implementation, the thermistor seat 20 may be adjacent to a cell region 11 in which the battery cell C is accommodated. In an implementation, the thermistor seat 20 may be in a circuit region 15 adjacent to the cell region 11. The thermistor 50 may be electrically connected to the protective circuit module 100, and the thermistor seat 20 (in which the thermistor 50 may be placed) may be in the first circuit region 151 in which the protective circuit module 100 is arranged.

The protective circuit module 100 may include the projection 150 to which the thermistor 50 is fixed. In an implementation, the projection 150 may protrude in the first direction Z1 and may be adjacent to or above (e.g., in a third direction Z3) the thermistor seat 20 from a main body 110 of the protective circuit module 100 in the first circuit region 151, and the thermistor 50 (fixed to the projection 150) may be placed or accommodated in the thermistor seat 20.

The thermistor seat 20 may include, e.g., a pair of first partition walls 21 and 21' extending (e.g., lengthwise) parallel to each other in a second direction Z2 (e.g., such that the thermistor 50 may be accommodated therebetween to surround the thermistor 50); and a second partition wall 22 extending (e.g., lengthwise) in the first direction Z1 across or between the pair of first partition walls 21 and 21' to connect end portions of the pair of first partition walls 21 and 21'. In an implementation, the thermistor 50 may be accommodated in a space formed or defined by the pair of first partition walls 21 and 21' and the second partition wall 22. In an implementation, the first and second directions Z1 and Z2 may cross each other, e.g., the first and second directions Z1 and Z2 may perpendicularly cross each other. In an implementation, the first direction Z1 may be a direction in which the projection 150 protrudes from the main body 110 of the protective circuit module 100 across the thermistor 50 which extends (e.g., lengthwise) in the second direction Z2, and in this regard, the first and second directions Z1 and Z2 may refer to directions crossing each other.

Referring to FIGS. 3 to 5B together, the thermistor 50 may include a thermistor chip 55 and thermistor wiring 51 extending from the thermistor chip 55 in the lengthwise direction of the thermistor 50 (e.g., in the second direction Z2). In an implementation, the first partition walls 21 and 21' may extend parallel to the lengthwise direction of the thermistor 50 (e.g., the second direction Z2). The first partition walls 21 and 21' may include, e.g., thin portions 21a and 21'a extending parallel to each other (with the thermistor wiring 51 having a relatively small thickness between the thin portions 21a and 21'a); and thick portions 21b and 21'b extending parallel to each other (with the thermistor chip 55 having a relatively large thickness between the thick portions 21b and 21'b). In an implementation, the thick portions 21b and 21'b of the first partition walls 21 and 21' may be higher or taller than the thin portions 21a and 21'a of the first partition walls 21 and 21' in a thickness direction of the thermistor chip 55 (e.g., in the third direction Z3). The pair of first partition walls 21 and 21' extending parallel to each other with the thermistor 50 therebetween may be connected to the second partition wall 22 extending across or between the pair of first partition walls 21 and 21'. In an implementation, the pair of first partition walls 21 and 21' and the second partition wall 22 may surround the thermistor 50.

The thermistor seat 20 may accommodate the thermistor 50 in a space defined by the first and second partition walls 21, 21', and 22 and a bottom surface, and an upper portion or side (e.g., battery cell C-facing side) of the thermistor seat 20 may be open to accommodate the thermistor 50. In an implementation, the bottom surface and the open upper portion of the thermistor seat 20 may respectively correspond to lower and upper ends of the thermistor seat 20 in the third direction Z3.

When the thermistor 50 is placed through the open upper portion of the thermistor seat 20 (or after the thermistor 50 is placed through the open upper portion of the thermistor seat 20), the projection 150 of the protective circuit module 100 may be on or at the open upper portion of the thermistor seat 20. The projection 150 of the protective circuit module 100 may extend across the open upper portion of the thermistor seat 20 such that the thermistor 50 may not be separated from the thermistor seat 20 because the projection 150 extends across or covers a portion of the thermistor 50 in the thermistor seat 20. The projection 150 of the protective circuit module 100 may cover a portion of the thermistor 50. In an implementation, the projection 150 of the protective circuit module 100 may cover the thermistor wiring 51, which has a relatively small thickness (e.g., as measured in the third direction Z3). The projection 150 of the protective circuit module 100 may protrude to or over the thermistor seat 20 from the main body 110 of the protective circuit module 100 in the first circuit region 151, such that the projection 150 may protrude above the open upper portion of the thermistor seat 20 to cover a portion of the thermistor 50 placed in the thermistor seat 20. In an implementation, the projection 150 of the protective circuit module 100 may protrude to cover a portion of the thermistor 50, e.g., the thermistor wiring 51 of the thermistor 50, and the thermistor 50 including the thermistor wiring 51 may be effectively prevented from being separated from the thermistor seat 20 (e.g., may be fixed in position).

In an implementation, the projection 150 of the protective circuit module 100 may protrude above the thermistor seat 20 in a state in which the thermistor wiring 51 is fixed to the projection 150. In an implementation, the projection 150 of the protective circuit module 100 (to which the thermistor wiring 51 is fixed) may cover the thermistor seat 20, and separation of the thermistor 50 from the thermistor seat 20 may be prevented at the same time the thermistor 50 is placed in the thermistor seat 20. In an implementation, the projection 150 of the protective circuit module 100 (to which the thermistor wiring 51 is fixed) may cover the thermistor seat 20, the thermistor wiring 51 may be between the bottom surface of the thermistor seat 20 and the projection 150, and the position of the thermistor 50 (including the thermistor wiring 51) may be fixed to or in the thermistor seat 20. In an implementation, the projection 150 may cover the thermistor wiring 51, and the thermistor wiring 51 may be effectively prevented from being separated from the thermistor seat 20 through the open upper portion of the thermistor seat 20. In an implementation, a portion of the thermistor 50, e.g., the thermistor wiring 51 of the thermistor 50, may be accommodated in the thermistor seat 20 in a state in which the thermistor wiring 51 is fixed to the projection 150 of the protective circuit module 100, and the position of the thermistor 50 may be securely maintained in the thermistor seat 20.

In an implementation, the projection 150 of the protective circuit module 100 may not be coupled to the thermistor 50. In an implementation, the projection 150 of the protective circuit module 100 may extend across or cover a portion of the thermistor 50, e.g., the thermistor wiring 51 of the thermistor 50, and the thermistor 50 may not be separated or removed from the thermistor seat 20.

In an implementation, the thermistor wiring 51 may extend between the protective circuit module 100 and the thermistor chip 55 in the length direction of the thermistor 50 (e.g., in the second direction Z2). In an implementation, the thermistor wiring 51 may have one end connected to the projection 150 of the protective circuit module 100 and another end connected to the thermistor chip 55. In an implementation, the end of the thermistor wiring 51 may be electrically connected to the projection 150 of the protective circuit module 100 while forming a coupling portion S (e.g., through soldering or welding) for electrical connecting with the projection 150 of the protective circuit module 100.

The projection 150 of the protective circuit module 100 may protrude above the thermistor seat 20 from the main body 110 of the protective circuit module 100 in the circuit region 15, e.g., in the first circuit region 151, such that the projection 150 may cover a portion of the thermistor 50 accommodated in the thermistor seat 20 and may help prevent separation of the thermistor 50 from the thermistor seat 20. In an implementation, the projection 150 of the protective circuit module 100 may cover a portion of the thermistor 50, e.g., may cover the thermistor wiring 51 of the thermistor 50, and the thermistor chip 55 connected to the thermistor wiring 51 may be exposed, e.g., may not be covered by the projection 150. The thermistor chip 55 may be for sensing an ambient temperature, e.g., the thermistor chip 55 may be exposed away from or by the projection 150 and may directly face a battery cell C at a position away from the projection 150 for reliable heat transfer between the battery cell C and the thermistor chip 55.

Referring to FIG. 6, a battery cell C may be arranged above or on the thermistor seat 20. The battery cell C may be on the thermistor 50 accommodated in the thermistor seat 20 and may face the thermistor 50. In an implementation, the battery cell C and the thermistor 50 may be arranged or aligned in the third direction Z3 to face each other. In an implementation, the thermistor 50 and the battery cell C may face each other, reliable heat transfer may occur between the thermistor 50 and the battery cell C, and the thermistor 50 and the battery cell C may be thermally connected to each other. The battery cell C may include an electrode assembly, a pouch-type casing which surrounds the electrode assembly, and an electrode tab Ct extending outwardly through a portion of the casing. In an implementation, the electrode tab Ct may be electrically connected to the electrode assembly and may extend outward through a portion of the casing, e.g., through a terrace TR or side of the casing.

In an implementation, the terrace TR of the battery cell C may be arranged above or on (e.g., may overlie) the thermistor seat 20, and the electrode tab Ct may extend outwardly from the terrace TR overlying the thermistor seat 20 and may be connected to the protective circuit module 100 in the first circuit region 151. In an implementation, the terrace TR of the battery cell C may face the thermistor 50 in the thermistor seat 20. In an implementation, the terrace TR of the battery cell C may face the thermistor chip 55 of the thermistor 50 such that the thermistor chip 55 may measure the temperature of the battery cell C, e.g., the temperature of the terrace TR of the battery cell C from which the electrode tab Ct outwardly extends. The thermistor chip 55 may be a part of the thermistor 50 for sensing the ambient temperature (e.g., the temperature of an environment or object adjacent to the thermistor 50), and the thermistor chip 55 may sensitively measure the temperature of the battery cell C by sensing the temperature of the terrace TR (from which the electrode tab Ct outwardly extends) in a state in which the electrode tab Ct is connected to the electrode assembly and may be capable of effectively transferring the internal temperature of the battery cell C, such that overheating of the battery cell C may be reliably detected without failure.

In an implementation, as illustrated in FIGS. 5A and 5B, at the same time the protective circuit module 100 is in the circuit region 15 of the frame 10, e.g., in the first circuit region 151 of the frame 10, the thermistor 50 may be placed or accommodated in the thermistor seat 20 by the projection 150 of the protective circuit module 100 to which an end of the thermistor wiring 51 may be fixed. In an implementation, the protective circuit module 100 is in the first circuit region 151 of the frame 10, and the thermistor 50 may be placed in the thermistor seat 20 by the projection 150 protruding above or covering the thermistor seat 20 in the first circuit region 151. In an implementation, the thermistor 50 may be fixed to the projection 150 of the protective circuit module 100, such that the protective circuit module 100 and the thermistor 50 may be simultaneously mounted. In an implementation, at the same time the protective circuit module 100 is mounted in the first circuit region 151 of the frame 10, the thermistor 50 (fixed to the projection 150 of the protective circuit module 100) may be placed in the thermistor seat 20, because the projection 150 protrudes above or covers the thermistor seat 20 in the first circuit region 151. In an implementation, the thermistor 50 may be fixed to the projection 150 of the protective circuit module 100, and the protective circuit module 100 and the thermistor 50 may be simultaneously mounted respectively in the first circuit region 151 and the thermistor seat 20 of the frame 10.

In an implementation, the thermistor wiring 51 may not be fixed to the projection 150 of the protective circuit module 100. In an implementation, the thermistor 50 may be placed in the thermistor seat 20, and then the projection 150 of the protective circuit module 100 may be placed above the thermistor 50 to cover a portion of the thermistor 50. Thereafter, a battery cell C may be placed in a cell region 11 of the frame 10 such that the thermistor chip 55 and a portion of the battery cell C, e.g., the terrace TR of the battery cell C may face each other. According to this structure, after the thermistor 50 is placed in the thermistor seat 20, the thermistor wiring 51 (e.g., a portion of the thermistor wiring 51) of the thermistor 50 may be doubly covered with the projection 150 of the protective circuit module 100 and the terrace TR of the battery cell C, and the thermistor chip 55 may be exposed from or by the projection 150 of the protective circuit module 100, and may be covered with the terrace TR of the battery cell C.

The terrace TR of the battery cell C may entirely cover the thermistor 50 in the thermistor seat 20 and may help prevent the thermistor 50 from being separated from the thermistor seat 20. Together with the terrace TR of the battery cell C, the projection 150 of the protective circuit module 100 may also help prevent separation of the thermistor 50 in the thermistor seat 20. In an implementation, the projection 150 of the protective circuit module 100 may fix the position of the thermistor 50 before the battery cell C is arranged, and the battery cell C may easily be arranged.

The terrace TR of the battery cell C may help prevent separation of the thermistor 50 by entirely covering the thermistor 50 in the thermistor seat 20, and the projection 150 of the protective circuit module 100 may fix the position of the thermistor 50 by fixing a portion of the thermistor 50, e.g., an end of the thermistor wiring 51 of the thermistor 50. In an implementation, the projection 150 of the protective circuit module 100 may not be coupled to the thermistor 50, and in this case, the projection 150 of the protective circuit module 100 may extend across or cover a portion of the thermistor 50 in the thermistor seat 20 and may help prevent separation of the thermistor 50 such that when the battery cell C is later arranged, wobbling of the thermistor 50 may be prevented, and the battery cell C may easily be arranged.

In an implementation, the projection 150 of the protective circuit module 100 may be between an end of the thermistor wiring 51 and the battery cell C, and the thermistor chip 55 connected to the thermistor wiring 51 may be exposed from (e.g., adjacent to) the projection 150 of the protective circuit module 100. In an implementation, reliable heat transfer may be achieved between the thermistor chip 55 and the battery cell C to measure the temperature of the battery cell C. In an implementation, the thermistor chip 55 and the battery cell C may be arranged to directly face each other for reliable heat transfer therebetween. In an implementation, the projection 150 of the protective circuit module 100 may extend across or cover the thermistor wiring 51 to help prevent separation of the thermistor 50, and the projection 150 of the protective circuit module 100 may not be between the thermistor chip 55 and the battery cell C, such that the thermistor chip 55 may be exposed adjacent to the projection 150 of the protective circuit module 100 for reliable heat transfer between the thermistor chip 55 and the battery cell C. In an implementation, the projection 150 of the protective circuit module 100 may protrude above or cover the thermistor seat 20 in a state in which the projection 150 fixes an end of the thermistor wiring 51, and the projection 150 may not extend to cover the thermistor chip 55 in the length direction of the thermistor 50 (the second direction Z2). In an implementation, in the length direction of the thermistor 50 (the second direction Z2), a portion of the thermistor wiring 51 other than the end of the thermistor wiring 51, and the thermistor chip 55 may be exposed adjacent to the projection 150 of the protective circuit module 100. In an implementation, the projection 150 of the protective circuit module 100 may extend across or cover an end of the thermistor wiring 51, and the other portion of the thermistor wiring 51 and the thermistor chip 55 may be exposed adjacent to (e.g., not covered by) the projection 150. In an implementation, the projection 150 of the protective circuit module 100 may cover the end of the thermistor wiring 51 in a state in which the projection 150 fixes the end of the thermistor wiring 51, the position of the thermistor 50 may be effectively fixed to or in the thermistor seat 20, and wobbling of the thermistor 50 may be prevented before the battery cell C is arranged such that the battery cell C may easily be arranged.

Referring to FIG. 1, the battery pack may include the first and second label sheets L1 and L2 attached to face each other in a state in which the battery cells C, the protective circuit module 100, and the flexible circuit board 200 are on the frame 10 between the first and second label sheets L1 and L2. The first and second label sheets L1 and L2 may firmly bind the battery cells C, the protective circuit module 100, and the flexible circuit board 200 which are coupled to the frame 10, and may firmly bind the frame 10, the battery cells C, the protective circuit module 100, and the flexible circuit board 200 to help prevent separation of the battery cells C in the cell regions 11 and help prevent separation of the protective circuit module 100 and the flexible circuit board 200 in the circuit regions 15.

In an implementation, the first label sheet L1 may be attached to the frame 10, and the second label sheet L2 may be attached to the battery cells C, the protective circuit module 100, and the flexible circuit board 200 on the frame 10. In an implementation, the second label sheet L2 may extend (e.g., lengthwise) in the length direction of the battery pack across the battery cells C, and the protective circuit module 100, and the flexible circuit board 200 which are between the battery cells C.

The battery cells C, the protective circuit module 100, and the flexible circuit board 200, which are coupled to the frame 10, may be bound to each other through the first and second label sheets L1 and L2, and the first and second label sheets L1 and L2 may also provide regions for indicating information about the battery pack such as a manufacturer.

By way of summation and review, small mobile devices such as cellular phones may be operated for a predetermined time using single-cell secondary batteries. Battery packs having high-output, high-capacity features may be suitable for devices having long operating times and consuming large amounts of power such as electric vehicles and hybrid electric vehicles. The output voltages or currents of battery packs may be increased by adjusting the number of battery cells included in the battery packs.

As described above, according to the one or more of the embodiments, the battery pack may have an improved and simple structure for fixing the thermistor 50, which may be used to measure the temperature of the battery cells C, and thus the battery pack may be easily assembled while securely fixing the position of the thermistor 50 using the improved and simplified structure.

One or more embodiments may provide a battery pack having an improved structure for fixing a thermistor used to measure the temperature of a battery cell.

One or more embodiments may provide a battery pack that may be easily assembled.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a frame including a thermistor seat and a thermistor accommodated in the thermistor seat;
at least one battery cell on the frame and connected to the thermistor; and
a protective circuit module, the protective circuit module including a projection between a portion of the thermistor and the at least one battery cell,
wherein:
the thermistor seat includes:
a pair of first partition walls extending parallel to each other and surrounding the thermistor; and
a second partition wall extending between the pair of first partition walls and connecting end portions of the pair of first partition walls to each other,
the thermistor is accommodated in a space between the pair of first partition walls and the second partition wall, and
the projection protrudes from a main body of the protective circuit module above a portion of the thermistor seat and covers the portion of the thermistor in the thermistor seat, at least a top of one of the pair of first partition walls, and at least a portion of the space between the pair of first partition walls,
wherein: the thermistor includes a thermistor wiring, the thermistor wiring extending along and in parallel to a bottom of the projection, and the projection covers one terminal end of the thermistor wiring of the thermistor.

2. The battery pack as claimed in claim 1, wherein:
the projection protrudes from the main body of the protective circuit module to cover the portion of the thermistor seat, and
the one terminal end of the thermistor wiring is fixed directly to the bottom of the projection.

3. The battery pack as claimed in claim 2, wherein the one end of the thermistor wiring is soldered to the projection.

4. The battery pack as claimed in claim 1, wherein:
the thermistor further includes a thermistor chip connected to the thermistor wiring, and
the thermistor chip is not covered by the projection.

5. The battery pack as claimed in claim 4, wherein:
the one terminal end of the thermistor wiring is covered by the projection, and
another terminal end of the thermistor wiring is connected to the thermistor chip.

6. The battery pack as claimed in claim 4, wherein the at least one battery cell directly faces the thermistor chip that is not covered by the projection of the protective circuit module.

7. The battery pack as claimed in claim 1, wherein:
the at least one battery cell includes an electrode assembly, a casing surrounding the electrode assembly, and an electrode tab connected to the electrode assembly and extending outwardly through a terrace of the casing;
the terrace of the at least one battery cell is above the thermistor seat; and
the electrode tab extends outwardly from the terrace over the thermistor seat and is connected to the protective circuit module.

8. The battery pack as claimed in claim 1, wherein the frame includes:
a cell region having a rim shape surrounding an opening in which at least a portion of the at least one battery cell is accommodated; and
a circuit region between adjacent cell regions and in which the protective circuit module is accommodated.

9. The battery pack as claimed in claim 8, wherein a portion of the at least one battery cell that corresponds to an electrode assembly of the at least one battery cell is accommodated in the opening of the cell region.

10. The battery pack as claimed in claim 8, wherein the thermistor seat is in the circuit region adjacent to the cell region.

11. The battery pack as claimed in claim 1, wherein:
the thermistor includes a thermistor wiring and a thermistor chip, and
the pair of first partition walls includes:
thin portions between which the thermistor wiring is arranged, the thin portions having a first height and extending parallel to each other; and
thick portions between which the thermistor chip is arranged, the thick portions having a second height that is greater than the first height and extending parallel to each other.

12. The battery pack as claimed in claim 1, wherein:
the at least one battery cell includes a first battery cell, a second battery cell, and a third battery cell, which are arranged in a row with the first battery cell between the second battery cell and the third battery cell,
the protective circuit module is between the first battery cell and the second battery cell,
the battery pack further includes a flexible circuit board between the first battery cell and the third battery cell.

13. The battery pack as claimed in claim 12, wherein the frame includes:
a first cell region, a second cell region, and a third cell region each having a rim shape surrounding openings in which at least portions of the first battery cell, the second battery cell, and the third battery cell are respectively accommodated;
a first circuit region between the first cell region and the second cell region and in which the protective circuit module is accommodated; and
a second circuit region between the first cell region and the third cell regions and in which the flexible circuit board is accommodated.

14. The battery pack as claimed in claim 12, wherein the first battery cell and the second battery cell are electrically connected to the protective circuit module through electrode tabs facing each other and extending toward the protective circuit module.

15. The battery pack as claimed in claim 12, wherein the third battery cell is connected to the flexible circuit board through an electrode tab extending toward the flexible circuit board and is electrically connected to the protective circuit module through the flexible circuit board.

16. The battery pack as claimed in claim 12, wherein:
the first battery cell and the third battery cell respectively include electrode tabs oriented in an identical direction,
the electrode tab of the first battery cell is directly connected to the protective circuit module, and
the electrode tab of the third battery cell is connected to the protective circuit module through the flexible circuit board between the first battery cell and the third battery cell.

17. The battery pack as claimed in claim 16, wherein the flexible circuit board includes:
a main body connected to the electrode tab of the third battery cell; and
an extension that extends from the main body along a side surface of the first battery cell around the first battery cell and is connected to the protective circuit module.

18. The battery pack as claimed in claim 1, wherein:
a longitudinal direction of the projection is parallel to a longitudinal direction of the protective circuit module and to a longitudinal direction of the entire thermistor wiring, a protruding direction of the projection above the portion of the thermistor seat being perpendicular to the longitudinal direction of the projection, and
the projection covers a majority of a length of the thermistor wiring.

19. The battery pack as claimed in claim 1, wherein:
a longitudinal direction of each of the pair of first partition walls of the thermistor seat is parallel to a longitudinal direction of the projection, the thermistor being in the space between the pair of first partition walls, and
the main body of the protective circuit module is outside the space between the pair of first partition walls.

\* \* \* \* \*